US012090109B2

United States Patent

(12) United States Patent
Chen et al.

(10) Patent No.: US 12,090,109 B2
(45) Date of Patent: Sep. 17, 2024

(54) VIBRATION APPARATUS AND MASSAGE DEVICE COMPRISING VIBRATION APPARATUS

(71) Applicants: WENZHOU CHISA TOYS CO., LTD., Leqing (CN); SHENZHEN BESTON E-COMMERCE CO., LTD., Shenzhen (CN)

(72) Inventors: Zhixia Chen, Leqing (CN); Xiaolin Li, Shenzhen (CN)

(73) Assignees: WENZHOU CHISA TOYS CO., LTD., Leqing (CN); SHENZHEN BESTON E-COMMERCE CO., LTD., Shenzhen (CN)

( * ) Notice: Subject to any disclaimer, the term of this patent is extended or adjusted under 35 U.S.C. 154(b) by 0 days.

(21) Appl. No.: 18/271,734

(22) PCT Filed: Jan. 11, 2021

(86) PCT No.: PCT/CN2021/071036

§ 371 (c)(1),
(2) Date: Dec. 27, 2023

(87) PCT Pub. No.: WO2022/147822

PCT Pub. Date: Jul. 14, 2022

(65) Prior Publication Data

US 2024/0115456 A1 Apr. 11, 2024

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0153* (2013.01);
(Continued)

(58) Field of Classification Search
CPC ........ A61H 23/00-06; A61H 19/00-50; A61H 2201/1215; A61H 15/00-02;
(Continued)

(56) References Cited

U.S. PATENT DOCUMENTS 11,154,455 B2 * 10/2021 Ahn .......................... A61H 1/00
2006/0178602 A1 8/2006 Teng et al.
(Continued)

FOREIGN PATENT DOCUMENTS

CN 2002291829 A 10/2002
CN 102406379 A 4/2012
CN 105287183 A 2/2016
(Continued)

OTHER PUBLICATIONS

Translation of WO 2014/127531 (Year: 2014).*

*Primary Examiner* — Valerie L Woodward
*Assistant Examiner* — Paige Kathleen Bugg
(74) *Attorney, Agent, or Firm* — Cooper Legal Group, LLC

(57) ABSTRACT

The present invention relates to a vibration apparatus, comprising a masturbation cup, comprising a motor, a speed reduction mechanism and rotating body. The output of the motor, after being decelerated by the speed reduction mechanism drive the rotating body to rotate. The rotating body is an eccentric structure, internally provided with a cavity. The motor and the speed reduction mechanism are both arranged in the internal cavity of the rotating body. The present invention also relates to a masturbation cup and vibration rod vibration apparatus, by means of a built-in high-speed rotating ball, centrifugal forces in different directions are generated by means of high-speed rotation of the eccentric ball, such that a cup body of the masturbation cup is driven to move in various directions so that requirements of vibration strength and vibration amplitude can be met, and requirements of high telescopic frequency and strength can also be met.

13 Claims, 11 Drawing Sheets

(52) U.S. Cl.
CPC ................ *A61H 2201/0192* (2013.01); *A61H 2201/1463* (2013.01); *A61H 2201/1692* (2013.01)

(58) Field of Classification Search
CPC ........ A61H 1/001; A61H 1/002; A61H 1/005; A61H 1/006; A61H 1/008; A61H 2015/0007–0071; A61H 39/04; A62H 2023/002–045; F16H 13/00–08; F16H 1/00–12; F16H 1/20; F16H 1/206; F16H 1/22; F16H 21/02; F16H 21/46–48; F16H 25/04; F16H 35/18; F16H 57/02; F16H 57/023; F16H 2700/00; B01B 1/16
See application file for complete search history.

(56) References Cited

U.S. PATENT DOCUMENTS

| | | | | |
|---|---|---|---|---|
| 2016/0015596 | A1* | 1/2016 | Murison | A61H 19/44 600/38 |
| 2017/0367924 | A1* | 12/2017 | Nan | A61H 23/00 |
| 2020/0046599 | A1* | 2/2020 | Sedic | A61F 5/41 |

FOREIGN PATENT DOCUMENTS

| | | | | |
|---|---|---|---|---|
| CN | 205322743 | U | 6/2016 | |
| CN | 107028745 | A | 8/2017 | |
| CN | 111281771 | A | 6/2020 | |
| CN | 212016144 | U | 11/2020 | |
| EP | 3760178 | A1 * | 1/2021 | A61H 15/0078 |
| JP | 2008006254 | A | 1/2008 | |
| WO | WO-2014127531 | A1 * | 8/2014 | A61H 19/32 |

* cited by examiner

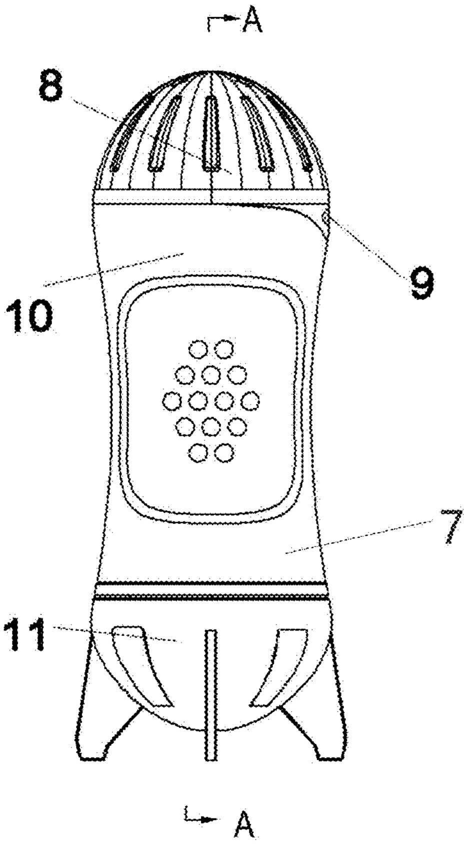
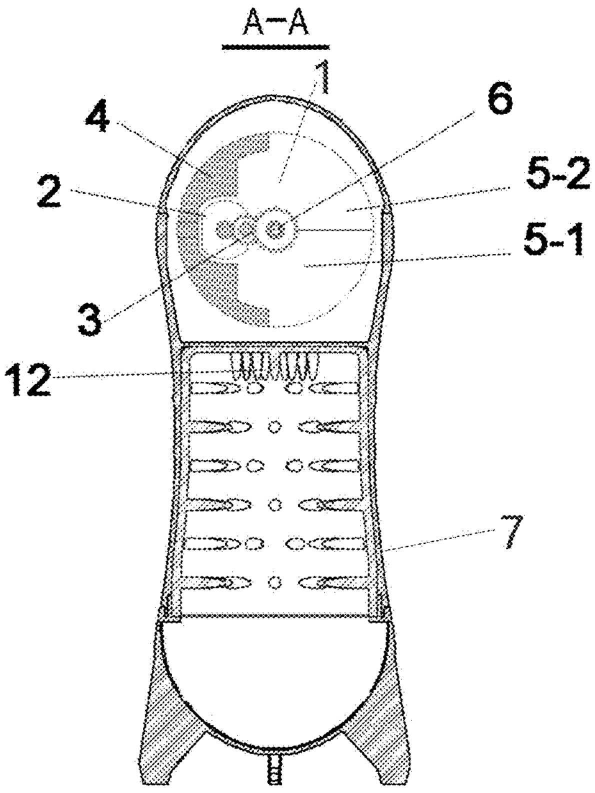
Fig. 1A
Fig. 1B

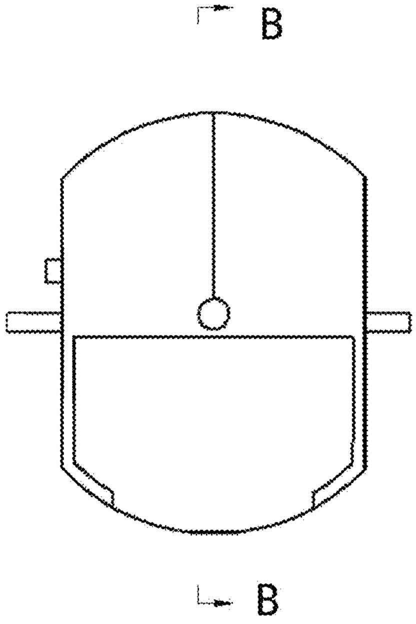
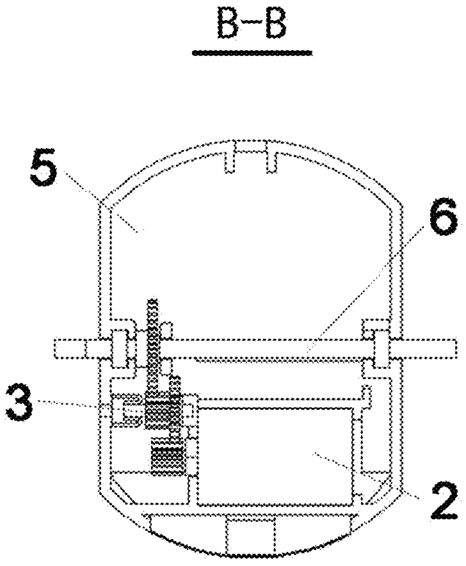
Fig. 3A
Fig. 3B

VIBRATION APPARATUS AND MASSAGE DEVICE COMPRISING VIBRATION APPARATUS

CROSS REFERENCE TO RELATED APPLICATION

This patent application claims the benefit and priority of PCT/CN2021/071036 filed with the International Bureau on Jan. 11, 2021.

TECHNICAL FIELD

The present disclosure relates to a vibration apparatus, and a stimulation and massage device for the erogenous zone (especially penis), which has the vibration apparatus.

BACKGROUND

In the conventional masturbation cup with vibration function, since a vibration apparatus with vibration function that comprises motor, eccentric block, etc. is installed, the size of the vibration apparatus tends to increase, which may affect the internal layout, and the installation of other devices, etc., and make it impossible to make a compact and versatile massage device. And depending on the installation position of the motor, eccentric block, etc. in the masturbation cup, it may also constrain the vibration apparatus from playing vibration function efficiently.

In addition, the conventional masturbation cup with vibration function has problems of low vibration amplitude and numb experience. Although the telescopic stroke of the masturbation cup with telescopic function is long, it has the limitation of large deceleration ratio of the telescopic gear box and the low telescopic frequency. If the deceleration ratio of the gear box is reduced, the telescopic force will become insufficient so that a good massage effect on male genitalia cannot be produced.

SUMMARY

In order to overcome the defects and shortcomings of the prior art, the present invention miniaturizes the structure of the vibration apparatus with a motor, eccentric block, etc., making the vibration apparatus compact and integrated, which can not only achieve the required various vibration functions, but can also be easily installed in a relatively small space, so as to achieve the overall miniaturization and portability.

The present invention generates centrifugal force in different directions by means of a built-in high-speed rotating ball (the center of gravity of the ball deviates from the axis) rotating at high speed, which drives the cup body of a masturbation cup to generate movement in different directions by means of high-speed rotation of the eccentric ball. The device can output ultra-high speed and centrifugal force when the deceleration ratio of the gear box is small, thereby providing strong vibration and large amplitude of vibration while keeping high telescopic frequency and large strength. It can produce a good stimulation effect on male genitalia and bring a strong sense of pleasure to men.

In addition, the present invention discloses a masturbation cup that can fully massage and stimulate the sensitive points of the penis within the male's acceptable range and assist in dredging the collaterals, by comprehensive physical conduction massage of centrifugal force and multi-force stimulation on the penis. It can increase the amount of penis congestion and reduce the sensitivity of penis sensitive nerves, without side effects after use.

The present invention provides a vibration apparatus, comprising a motor, a speed reduction mechanism and a rotating body, wherein the output of the motor after being decelerated by the speed reduction mechanism drives the rotating body to rotate, wherein the rotating body is of an eccentric structure with a cavity inside, and the motor and the speed reduction mechanism are both provided inside the cavity of the rotating body.

Preferably, the output speed of the motor can be adjusted.

Preferably, the speed reduction mechanism is a deceleration gear set.

Preferably, the rotating body is a ball provided with two flattened ends and an eccentric block, and the faces of the flattened ends are parallel to the rotating direction of the rotating body.

Preferably, the eccentric ball is composed of two hemispherical blocks.

Preferably, the position of the eccentric block can be adjusted.

The present invention also provides a masturbation cup comprising the vibration apparatus, which comprises a cup cover, a cup and a base, wherein, the cup comprises a cup bottom, a cup body, and a cup mouth, wherein a lower edge of the cup cover is coupled with an upper edge outer wall of the cup bottom, the base is coupled with the cup mouth, the vibration apparatus is placed between the cup cover and the outer wall of the cup bottom, and the rotating body is coupled with the cup bottom by a supporting shaft, so that vibration of the vibration apparatus makes the cup vibrate.

Preferably, the motor is fixed to the rotating body, the rotating body is fixed with the supporting shaft, the supporting shaft is configured to be rotatable in a shaft groove of the cup, the output of the motor after being decelerated by the speed reduction mechanism drives the rotating body to rotate.

Preferably, the motor is fixed to the supporting shaft, the rotating body is configured to be rotatable around the supporting shaft, and the output of the motor after being decelerated by the speed reduction mechanism drives the rotating body to rotate around the supporting shaft.

Preferably, the size of the cup can be adjusted.

Preferably, a villous structure for massage is provided on the inner wall of the cup.

Preferably, the villous structure is configured as cylindrical bumps made of silica gel that are distributed with even intervals, and the cylindrical bumps are integrated to the inner wall of the cup to form a cylindrical space with a diameter of about 3 cm in the middle of the cup.

The invention also provides a vibration rod comprising the vibration apparatus, which comprises a vibration rod body that is provided with a hollow space inside, wherein, the vibration apparatus is placed in the hollow space.

The device generates centrifugal force by using a motor and a deceleration gear box to drive the eccentric ball to rotate at a high speed. The centrifugal force generated by the high-speed rotation of the eccentric ball is distributed in the normal direction of the centroid of the ball. As the eccentric ball rotates to a specific angle, it generates centrifugal force in a specific direction accordingly. The centrifugal force in the same direction as the cup body generates push-and-pull movement. The centrifugal force perpendicular to or at a certain angle with the cup body drives the cup body to vibrate in all directions. Due to the high-speed rotation of the eccentric ball, the device produces a technical effect of combination of vibration and push-and-pull movements.

Specifically, the present invention provides a vibration apparatus and a masturbation cup and a vibration rod comprising the vibration apparatus. The vibration apparatus is provided with a built-in eccentric ball (the center of gravity of the ball deviates from the axis) rotating at high speed. The centrifugal force in different directions is produced by high-speed rotation of the eccentric ball, and drives the cup body of the masturbation cup to generate movement in multiple directions. Thus, a vibration apparatus capable of providing highly efficient vibration function and a masturbation cup incorporating the same can be made with multiple functions, miniaturization. The device can output ultra-high speed and centrifugal force when the deceleration ratio of the gear box is small, thereby providing strong vibration and large amplitude of vibration while keeping high telescopic frequency and large strength. It can produce a good stimulate effect on male genitalia and bring a strong sense of pleasure to men.

BRIEF DESCRIPTION OF DRAWINGS

To better describe the technical solutions in the embodiments of the present invention or the prior art, drawings necessary for describing the embodiments or the prior art will be briefly introduced below. Obviously, the drawings in the following description are only a part of the drawings of the present invention. For a person of those of ordinary skill in the art, other drawings can be obtained based on the provided drawings without paying creative efforts.

FIGS. 1A and 1B are an external view and an internal structure of a masturbation cup comprising a vibration apparatus according to the present invention;

FIGS. 3A and 3B are an external view and a sectional view along the direction of B-B' of an embodiment of a vibration apparatus according to the present invention;

Figure 2A:
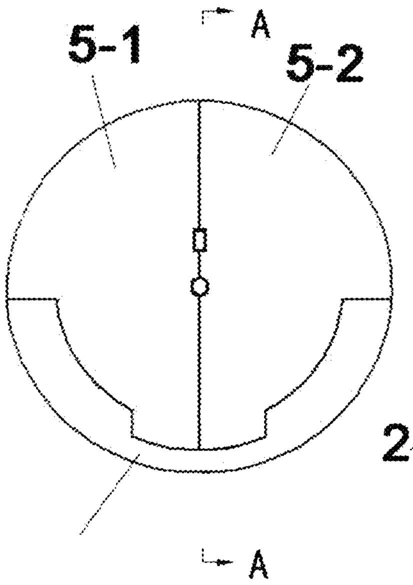
FIGS. 2A and 2B are an external view and a sectional view along the A-A' direction of an embodiment of a vibration apparatus according to the present invention.

In the drawings: 1. vibration apparatus; 2. motor; 3. deceleration gear set; 4. eccentric block; 5. eccentric ball; 6. supporting shaft; 7. masturbation cup; 8. cup cover; 9. ON/OFF key; 10. cup body; 10-1. cup bottom; 10-2. cup body; 10-3. cup mouth; 11. base; 12. villous structure; 13. opening of the masturbation cup; 14 vibration rod; 14. vibration rod body; 16. handle.

DETAILED DESCRIPTION

The technical scheme of the present invention will be described clearly and completely in the following specific embodiments. Obviously, the described embodiments are only part of the embodiments of the present invention, not all of them. Based on the embodiments of the present invention, all other embodiments obtained by those of ordinary skill in the art without creative work belong to the scope of the invention.

In the following embodiments, the same or similar reference labels throughout represent the same or similar elements or elements with the same or similar functions. The embodiments described below with reference to the accompanying drawings are exemplary and are only used to explain the present invention, and cannot be understood as a limitation to the present invention.

Figure 2B:
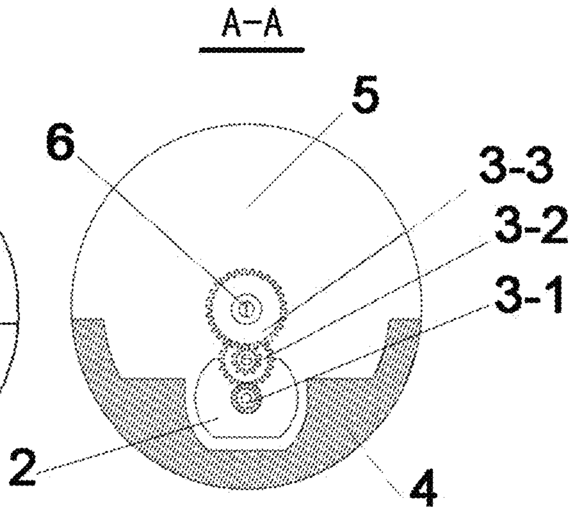

Referring to FIGS. 2A and 2B, a vibration apparatus 1 according to the present invention comprise a motor 2, a deceleration gear set 3, and an eccentric ball 5 provide with an eccentric block 4. The eccentric ball 5 is of a hollow structure, and the motor 2 and the deceleration gear set 3 are built into the hollow structure of the eccentric ball 5. The output shaft of motor 2 drives the driving gear of the deceleration gear set 3, which drives the eccentric ball 5 to rotate after being decelerated through the deceleration gear set 3. In a preferred embodiment, the eccentric ball 5 is composed of two parts, 5-1 and 5-2. Due to the existence of the eccentric block 4, the eccentric ball 5 generates uneven centrifugal force in the circumferential direction, thus causing the eccentric ball 5 to vibrate.

In other embodiments, the eccentric ball 5 can be of other eccentric structure such as disk, cuboid, polyhedron, and irregular shaped rotator, that can rotate axially to produce vibration effect.

In an optional embodiment, referring to FIGS. 2A and 2B, the deceleration gear set 3 consists of three stages of gears, including a driving gear 3-1 coupled with the output shaft of the motor 2, a first stage driven gear 3-2 engaged with the driving gear, and the second stage driven gear 3-3 engaged with the first stage driven gear.

With reference to FIGS. 3A and 3B, the last stage of the driven gear 3-3 of the deceleration gear set 3 drives a supporting shaft 6 of the eccentric ball 5, thereby driving the eccentric ball 5 to rotate. The motor 2 is fixed on the eccentric ball 5. When the eccentric ball 5 rotates, the motor 2 and the deceleration gear set 3 rotate together with the eccentric ball 5.

Figure 4A:
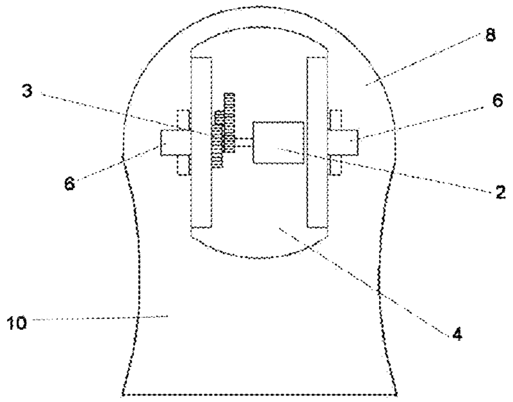
FIGS. 4A and 4B are an external view and a schematic view of the internal structure of an embodiment of a vibration apparatus according to the present invention.
Figure 4B:
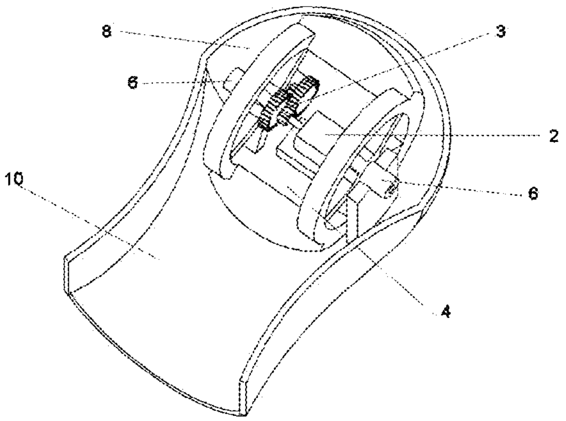

As another optional embodiment, referring to FIGS. 4A and 4B, the motor 2 is fixed at one end of the supporting shaft 6 of the eccentric ball 5, the output shaft of the motor 2 drives the deceleration gear set 3, and the second driven gear 3-3 of the deceleration gear set 3 is fixed to the eccentric ball 5, so that the eccentric ball 5 can be driven to rotate. The eccentric ball 5 can rotate around its supporting shaft 6. Thus, when the eccentric ball 5 rotates, the motor 2, the deceleration gear set 3, and the supporting shaft 6 remain stationary.

Figure 8A:
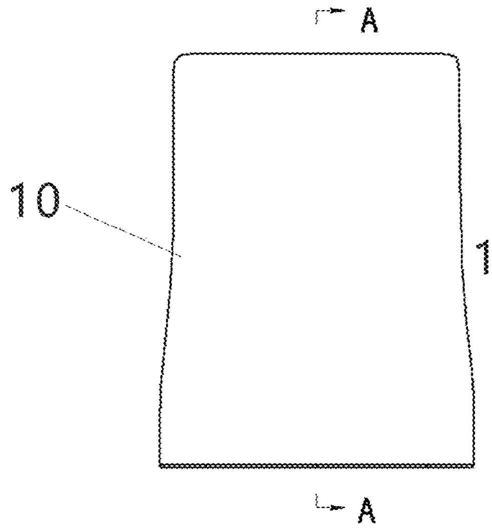
FIGS. 8A and 8B are external views of the cup and a sectional view along the A-A' direction of the inner wall provided with the villous structure.
Figure 8B:
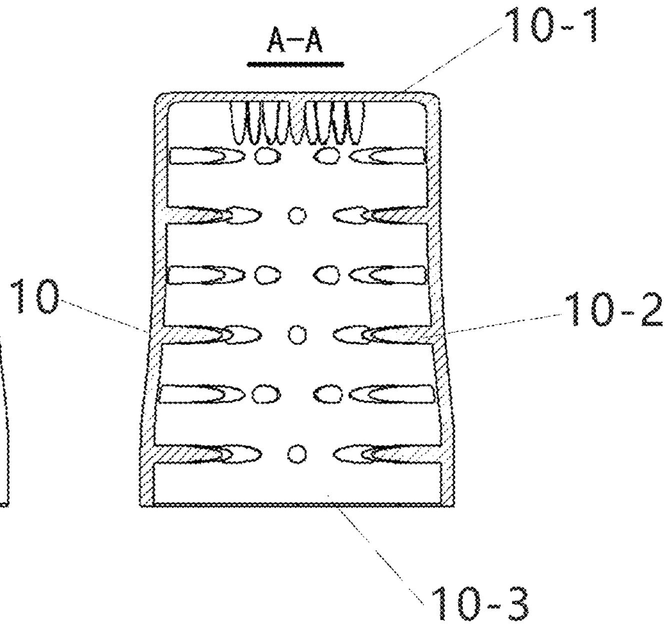

With reference to FIGS. 1A and 1B, the present invention also relates to a masturbation cup 7 comprising said vibration apparatus, said masturbation cup 7 comprising a cup cover, a cup 10 and a base 11. With reference to FIGS. 8A and 8B, the cup 10 is composed of the cup bottom 10-1, the cup body 10-2, and the cup mouth 10-3. The ON/OFF key 9 is provided on the cup cover 8 to turn the drive motor on or off. The cup cover 8 is tightly buckled with the cup body 10. The cup body 10 can be designed to be a shape suitable for being grasped by hand.

Figure 6:
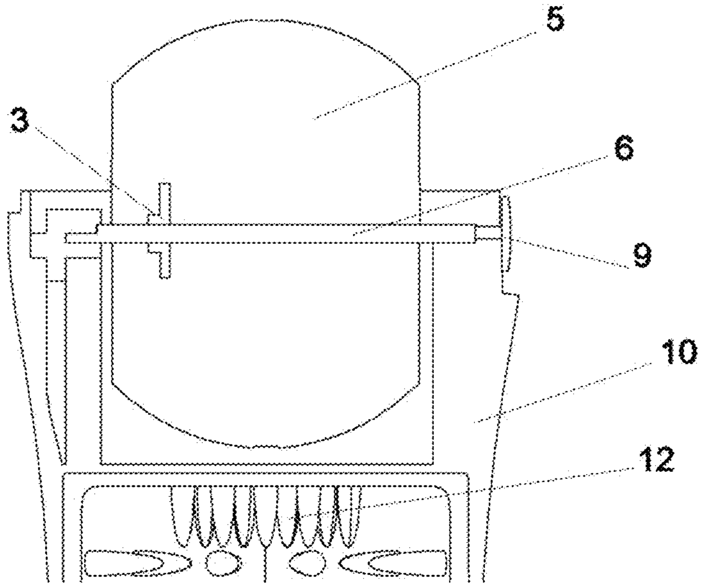
FIG. 6 is an external schematic view of the assembly structures of a vibration apparatus and a cup body of a masturbation cup according to the present invention.
Figure 7:
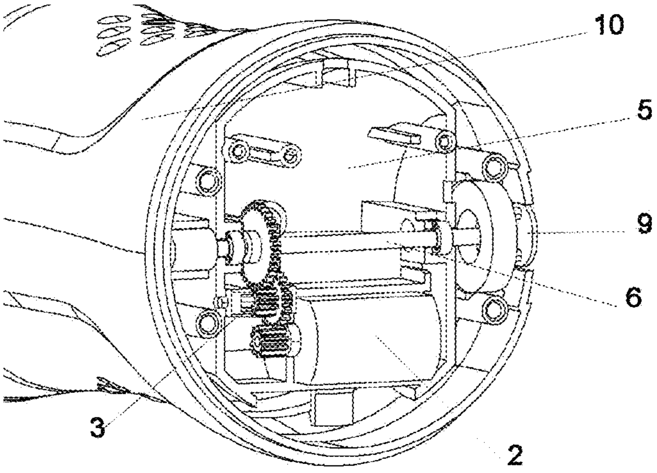
FIG. 7 is an internal schematic view of the assembly structures of a vibration apparatus and a cup body of a masturbation cup according to the present invention.

The vibration apparatus 1 is placed in a space formed by the cup cover 8 and the cup body 10. With reference to FIGS. 6 and 7, the eccentric ball 5 can be fixed to its supporting shaft 6 or rotated around the supporting shaft 6. When the eccentric ball 5 is fixed to the supporting shaft 6, the supporting shaft 6 can be rotatably provided in the rotation groove of the outer wall of the cup bottom 10-1. When the eccentric ball 5 rotates relative to the supporting shaft 6, the supporting shaft 6 is fixed in the rotation groove of the cup bottom 10-1.

Figure 5:
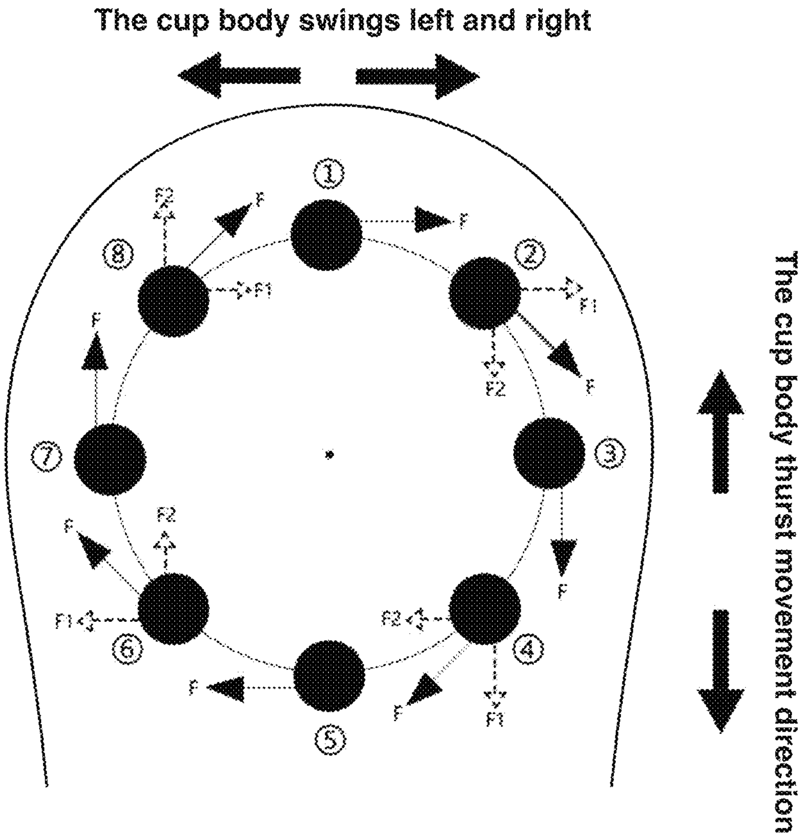
FIG. 5 is a diagram of centrifugal force change during the eccentric ball rotation of a vibration apparatus according to the present invention.

With reference to FIG. 5, when the eccentric ball 5 is in circular motion, the eccentric block 4 moves to each different position, and the centrifugal force is along the tangent direction of the motion track of the ball. The centrifugal force can be divided into two component forces, one perpendicular to the cub body and the other along the cup body. The component force perpendicular to the cup body makes the cup body swing from side to side, and the component force along the cup body makes the cup body push and pull.

When the eccentric block 4 is at position 1, the centrifugal force has only the component force F1 perpendicular to the cup body, and the component force F2 along the cup body is 0; at this position, the cup body has the largest amplitude of shaking to the right, and there is no push-and-pull movement along the cup body.

During the movement of eccentric block 4 from position 1 to position 2, the centrifugal force can be divided into the component force F1 perpendicular to the cup body and the component force F2 along the cup body, and F1 is gradually decreasing while F2 is gradually increasing. Accordingly, in this process, the cup body has a gradually decreasing amplitude of shaking to the right, while a downward amplitude of push-and-pull movement of the cup body starts to appear and is gradually increasing.

At position 2, the two component forces F1 and F2 are equal. At this position, the force that shakes the cup body to the right is equal to the force that drives the cup body downward.

During the movement of the eccentric block 4 from position 2 to position 3, F1 starts to be smaller than F2 gradually. In this process, the force that shakes the cup body to the right is further decreased, while the force that pulls the cup body downward is further increased.

When the eccentric block 4 is at position 3, F1 is decreased to 0, and the centrifugal force is entirely oriented along the cup body. At this position, it only remains the force that drags the cup body downward.

During the movement of the eccentric block 4 from position 3 to position 4, the component force F1 of the centrifugal force gradually increases from 0 whereas the component force F2 gradually decreases. In this process, a force that shakes the cup body to the left starts to appear and gradually increases, while the force that drags the cup body downward gradually decreases. But as F2 is still greater than F1, the combined effect is that the push-and-pull force driving the cup body downward is still stronger than the force shaking it to the left.

When the eccentric block 4 arrives at position 4, the two component forces F1 and F2 become equal. the push-and-pull force driving the cup body downward is the same as the force shaking it to the left.

During the movement of the eccentric block 4 from position 4 to position 5, F2 starts to be gradually smaller than F1. In this process, the moment that shakes the cup body to the left becomes gradually greater than the moment that drives the cup body downward.

When the eccentric block 4 arrives at position 5, F2 is decreased to 0, and the centrifugal force becomes completely perpendicular to the cup body. At this position, the combined moment shakes the cup body to the left entirely.

During the movement of the eccentric block 4 from position 5 to position 6, the centrifugal force F can be divided into a component force F1 shaking the cup body to the left and a component force F2 that pushes the cup body upward. The component force F1 gradually decreases whereas F2 gradually increases, but F1 is still greater than F2. Therefore, in this process, the moment that shakes the cup body to the left is combined with the moment that drives the cup body upward, but the former is greater than the latter.

When the eccentric block 4 arrives at position 6, the component forces F1 and F2 are equal. After combination, the moment that shakes the cup body to the left is equal to the moment that drives the cup body upward.

During the movement of the eccentric block 4 from position 6 to position 7, the component force F1 that makes the cup body shake to the left is gradually smaller than the component force F2 that drives the cup body upward. After combination, there is not only the moment that shakes the cup body to the left, but also the moment that drives the cup body upward, and the moment that drives the cup body upward is larger.

When the eccentric block 4 arrives at position 7, the component force F1 that shakes the cup body to the left is decreased to 0, whereas the component force F2 that drives the cup body upward reaches its maximum, and the combined moment makes the cup body go upward entirely.

During the movement of the eccentric block 4 from position 7 to position 8, the component force F1 that shakes the cup body to the right starts to appear and gradually increases, whereas the component force F2 that drives the cup body upward starts to decrease gradually, but F2 remains greater than F1. Therefore, in this process, the moment that shakes the cup body to the right is combined with the moment that drives the cup body upward, making the cup body largely go upward.

When the eccentric block 4 arrives at position 8, the component force F1 that shakes the cup body to the right is equal to the component force F2 that drives the cup body upward. After combination, the moment that shakes the cup body to the right is equal to the moment that drives the cup body upward.

During the movement of the eccentric block 4 from position 8 to position 1, the component force F2 that drives the cup body upward is gradually smaller than the component force F1 that shakes the cup body to the right, and when the moment that drives the cup body upward and the moment that shakes the cup body to the right are combined, the moment that makes the cup body shake to the right is larger. When the eccentric block 4 arrives at position 1, the component force F2 that makes the cup body move upward is decreased to 0, and the force that makes the cup body shake to the right reaches its maximum.

Since the eccentric ball directly acts on the supporting shaft, and the supporting shaft is fixed to the cup body of the masturbation cup, the pattern of forces acted on the masturbation cup is consistent with the centrifugal forces mentioned above. With the rotation of eccentric block 4, the force on the masturbation cup changes constantly, resulting in shaking. The opening of the masturbation cup is provided for inserting male genitalia. The shaking of the masturbation cup acts on the male genitalia through the villi made of silica gel on an inner wall of the masturbation cup, thus producing massage effect on the male genitalia.

The centrifugal force analysis shown in FIG. 5 is made without considering the dead weight of the eccentric block and external forces such as the user's grip force. In actual use, the gravity of the eccentric block and the strength and position of the user's grip force will have a certain impact on the force on the masturbation cup.

Therefore, in actual use, vibration of the masturbation cup will generate different moments depending on the position of users' grip, the strength of the grip force and the orientation of the cup body, and therefore result in different shakes of the cup body, and bring various massage experiences to users.

In an optional embodiment, users can adjust the position of the eccentric block relative to the eccentric ball through a slider or a knob kind of structure provided on the housing of the masturbation cup, so as to adjust the magnitude of the centrifugal force generated by the rotation of the eccentric ball, thereby changing degrees of the shakes. In one embodiment, the masturbation cup comprises a cup housing, a slide rail and an eccentric ball, wherein the base of the slide rail is fixed on an inner wall of the cup housing, and a slide plate of the slide rail is fixed on an inner wall of the eccentric ball. When users need to adjust the position of the eccentric ball to change the shaking force during use, they may change the distance from the eccentric ball to the center of the whole product by changing the length of the slide rail through push-and-pull. The acting force can be spread around by rolling of steel balls in the slide rail to ensure the overall horizontal and vertical stability of the masturbation cup.

In an optional embodiment, the size of the masturbation cup, including the height and the inner diameter, can be adjusted through a telescopic structure. For example, the villous structure on the inner wall of the masturbation cup may be composed of multiple independent blocks. When there is a need to change the inner diameter, users may change the left-and-right intervals between adjacent blocks by rotation so as to enlarge or reduce the inner diameter. When there is a need to change the inner length of the masturbation cup, users may change the front-and-back intervals between adjacent blocks by stretching, so as to change the inner length.

With reference to FIGS. 8A and 8B, the inner wall of the cup 10 is provided with a villus structure for stimulating and massaging the male reproductive organs inserted into the masturbation cup. Preferably, the villus structure is made of ergonomic materials such as silica gel.

Figure 9:
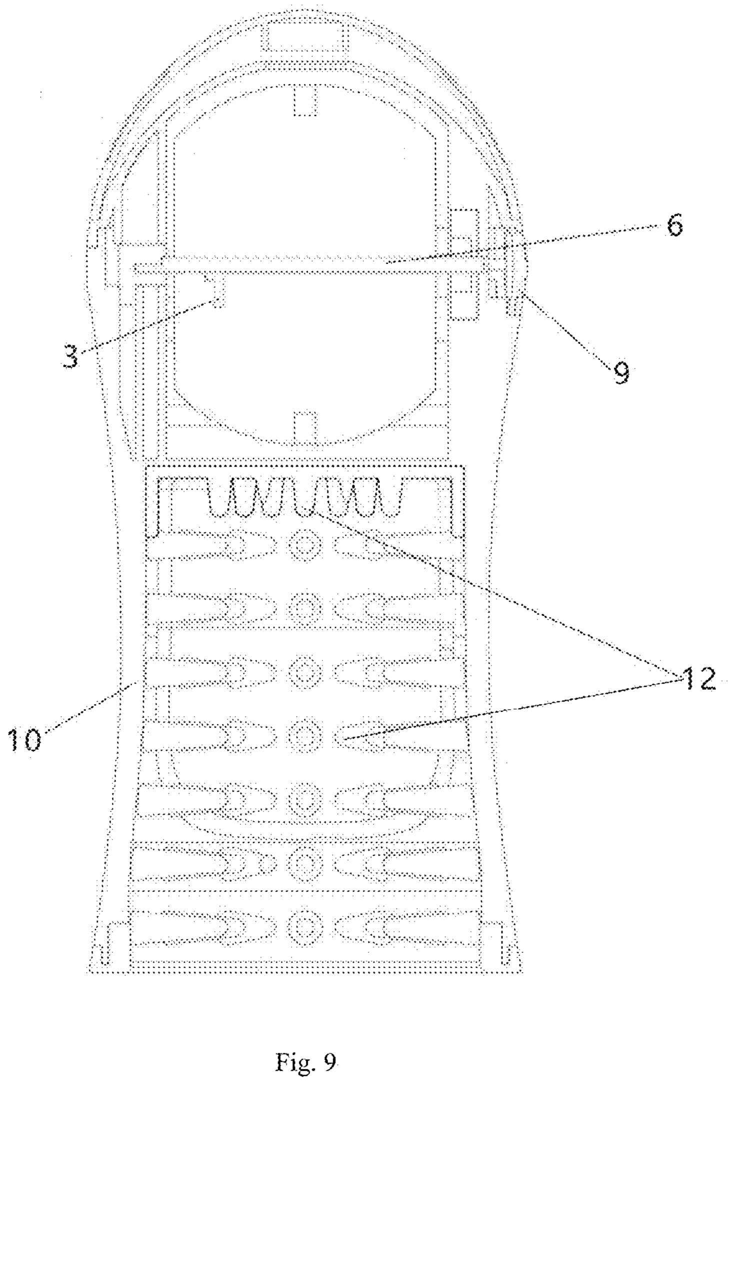
FIG. 9 is an overall internal view of an inner wall provided with the villous structure of a masturbation cup 7 according to the present invention.

With reference to FIG. 9, cylindrical villous structure 12 (silica gel, etc.) with a height of about 1.5 cm (preferably high enough to bend) are distributed with even intervals in the inner wall of the cup. The cylindrical villous structure 12 are integrated to the wall of the masturbation cup. And in the middle of the masturbation cup, a cylindrical space with a diameter of about 3 cm is formed. This space is used for male penis insertion in non-erectile and erectile states, and is a necessary space for power transmission to the convex points to massage the penis.

As shown in FIG. 5, when the ball moves to positions 3 and 7, the centrifugal force makes the masturbation cup move upward and downward in parallel, and the villous structure 12 rub in parallel with the penis surface. When the ball moves to the positions, the centrifugal force acts on the penis surface at certain angles. The centrifugal force acts on the surface of the penis and the glans successively in a circular motion, gradually generating a massage effect.

Figure 10:
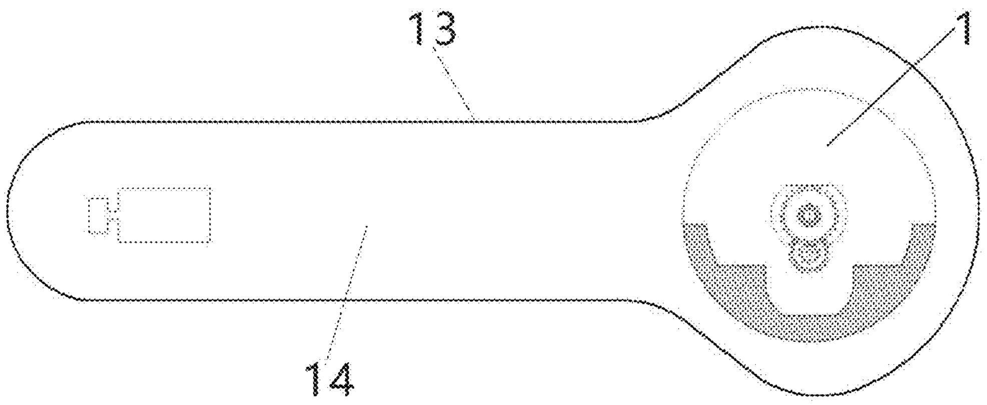
FIG. 10 is an overall view of an embodiment of a vibration rod according to the present invention.
Figure 11:
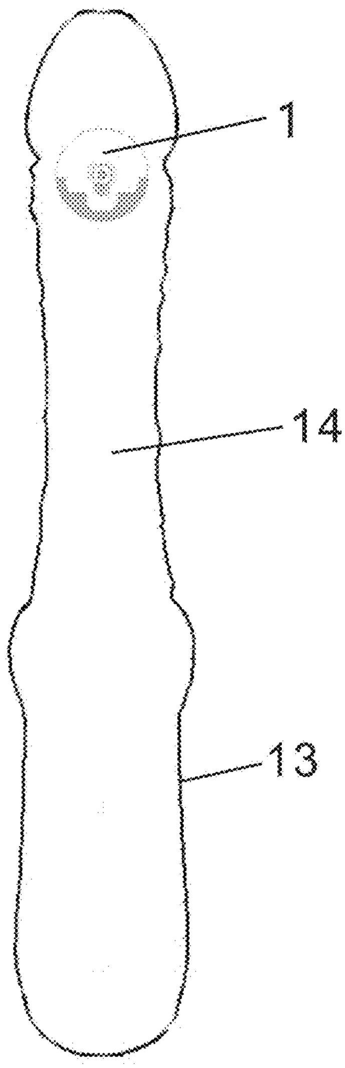
FIG. 11 is an overall view of an embodiment of a vibration rod according to the present invention.

With reference to FIGS. 10 and 11, the present invention also relates to a vibration rod incorporating the aforementioned vibration apparatus, comprising a vibration rod body that is provided with a hollow space inside for installing the vibration apparatus. The vibration apparatus can be located at any position of the vibration rod body. For example, in FIG. 10, the vibration apparatus is located at the rear end of the vibration rod body, while in FIG. 11, the vibration apparatus is located at the front end of the vibration rod body.

The above only illustrates exemplary embodiments of the present invention, but the protection scope of the present invention is not limited to this. Any person skilled in the art can easily think of changes or substitutions within the technical scope disclosed by the present invention, which should be covered by the protection scope of the present invention. Therefore, the protection scope of the present invention shall be the protection scope of claims.

What is claimed is:

1. A vibration apparatus, comprising a motor, a speed reduction mechanism and a rotating body, wherein an output of the motor, after being decelerated by the speed reduction mechanism, drives the rotating body to rotate, wherein the rotating body is of an eccentric structure, internally provided with a cavity, and the motor and the speed reduction mechanism are both housed entirely in the cavity of the rotating body.

2. The vibration apparatus according to claim 1, wherein an output speed of the motor is adjustable.

3. The vibration apparatus according to claim 1, wherein the speed reduction mechanism is a deceleration gear set.

4. The vibration apparatus according to claim 1, wherein the rotating body is a ball provided with two flattened ends and an eccentric block, and faces of the two flattened ends are parallel to a rotating direction of the rotating body.

5. The vibration apparatus according to claim 4, wherein the ball is composed of two hemispherical blocks.

6. The vibration apparatus according to claim 4, wherein a position of the eccentric block is adjustable.

7. A masturbation cup comprising a vibration apparatus according to claim 1, comprising a cup cover, a cup and a base, wherein the cup comprises a cup bottom, a cup body and a cup mouth, wherein a lower edge of the cup cover is coupled with an outer wall of the cup bottom, the base is coupled with the cup mouth, the vibration apparatus is placed between the cup cover and the outer wall of the cup bottom, and the rotating body is coupled with the outer wall of the cup bottom by a supporting shaft, so that vibration of the vibration apparatus makes the cup vibrate.

8. The masturbation cup according to claim 7, wherein the motor is fixed to the rotating body, the rotating body is fixed with the supporting shaft, the supporting shaft is configured to be rotatable in a shaft groove of the cup, the output of the motor, after being decelerated by the speed reduction mechanism, drives the rotating body to rotate.

9. The masturbation cup according to claim 7, wherein the motor is fixed to the supporting shaft, the rotating body is configured to be rotatable around the supporting shaft, and the output of the motor, after being decelerated by the speed reduction mechanism, drives the rotating body to rotate around the supporting shaft.

10. The masturbation cup according to claim 7, wherein a size of the cup of the masturbation cup is adjustable.

11. The masturbation cup according to claim 7, wherein a villous structure for massage use is provided on an inner wall of the cup.

12. The masturbation cup according to claim 11, wherein the villous structure is configured as cylindrical bumps made of silica gel that are distributed at even intervals, and the cylindrical bumps are integrated to the inner wall of the cup to form a cylindrical space with a diameter of about 3 cm in a middle of the cup.

13. A vibration rod comprising the vibration apparatus according to claim 1, comprising a vibration rod body that is provided with a hollow space inside, wherein, the vibration apparatus is placed in the hollow space.

* * * * *